(12) United States Patent
Matsuda et al.

(10) Patent No.: US 7,486,663 B2
(45) Date of Patent: Feb. 3, 2009

(54) REMOTE ACCESS SERVER WHEREIN THE NUMBER OF LOGICAL LINK RESOURCES IS SET HIGHER THAN THE NUMBER OF PHYSICAL LINK RESOURCES

(75) Inventors: Tetsuo Matsuda, Minato-ku (JP); Masayuki Yamada, Minato-ku (JP); Kazuhiko Azuma, Minato-ku (JP); Toshikazu Maruyama, Minato-ku (JP)

(73) Assignee: NEC Corporation, Tokyo (JP)

( * ) Notice: Subject to any disclaimer, the term of this patent is extended or adjusted under 35 U.S.C. 154(b) by 1060 days.

(21) Appl. No.: 10/786,364

(22) Filed: Feb. 26, 2004

(65) Prior Publication Data

US 2004/0174866 A1 Sep. 9, 2004

(30) Foreign Application Priority Data

Mar. 3, 2003 (JP) ............................. 2003-055581

(51) Int. Cl.
*H04L 12/66* (2006.01)
(52) U.S. Cl. .................. 370/352; 370/353; 370/354; 370/355; 370/356; 370/400; 370/401
(58) Field of Classification Search ......... 370/352–353, 370/354–356, 400–401
See application file for complete search history.

(56) References Cited

U.S. PATENT DOCUMENTS

| | | | | |
|---|---|---|---|---|
| 5,805,823 A | * | 9/1998 | Seitz | 709/236 |
| 6,115,382 A | * | 9/2000 | Abe | 370/395.3 |
| 6,529,499 B1 | * | 3/2003 | Doshi et al. | 370/352 |
| 6,643,253 B1 | * | 11/2003 | Smith | 370/217 |
| 6,912,401 B2 | * | 6/2005 | Rosen et al. | 455/518 |
| 7,042,988 B2 | * | 5/2006 | Juitt et al. | 379/88.17 |
| 7,142,530 B1 | * | 11/2006 | Chewning et al. | 370/351 |
| 7,227,872 B1 | * | 6/2007 | Biswas et al. | 370/465 |
| 7,366,146 B2 | * | 4/2008 | Mose et al. | 370/338 |
| 2002/0131430 A1 | * | 9/2002 | Lindquist et al. | 370/401 |
| 2002/0150108 A1 | * | 10/2002 | Nattkemper et al. | 370/397 |
| 2004/0028036 A1 | * | 2/2004 | Mose et al. | 370/353 |
| 2004/0085948 A1 | * | 5/2004 | Cabana | 370/352 |
| 2004/0196826 A1 | * | 10/2004 | Bao et al. | 370/352 |

FOREIGN PATENT DOCUMENTS

| | | |
|---|---|---|
| JP | 2001-217898 A | 8/2001 |
| JP | 2002-10341 A | 1/2002 |
| JP | 2003-51855 A | 2/2003 |
| JP | 2003-318897 A | 11/2003 |

\* cited by examiner

*Primary Examiner*—Fan Tsang
*Assistant Examiner*—Hemant Patel
(74) *Attorney, Agent, or Firm*—Sughrue Mion, PLLC

(57) ABSTRACT

In a remote access server (RAS), the number of logical link resources, which are circuit resources between the RAS and an ISP server, is set greater than the number of physical link resources, which are circuit resources between the RAS and each terminal device. In the RAS, when a particular circuit undergoes a transition to the dormant state, only the physical link resource is released to allow use by other terminal devices while the logical link resource is maintained unchanged in a connected state, whereby the loss probability is reduced without increasing the number of physical link resources.

4 Claims, 10 Drawing Sheets

REMOTE ACCESS SERVER WHEREIN THE NUMBER OF LOGICAL LINK RESOURCES IS SET HIGHER THAN THE NUMBER OF PHYSICAL LINK RESOURCES

BACKGROUND OF THE INVENTION

1. Field of the Invention

The present invention relates to a remote access server and a communication system in which a dormant function is introduced, and to a resource management method for managing circuit resources that are provided in this remote access server.

2. Description of the Related Art

A remote access server (RAS) is used when a terminal device wishes to connect to the Internet by a dial-up connection. This RAS has the capability of connecting calls that are requested from a plurality of terminal devices by way of a circuit-switching network to an ISP (Internet Service Provider) server such as a Web server or mail server by way of the Internet.

When the terminal device in the above-described type of communication system is, for example, a portable telephone, the circuit to an RAS may sometimes be disrupted due to deterioration of the state of radio waves.

To remedy this type of problem, a communication system has been proposed in, for example, Japanese Patent Laid-Open Publication No. 2002-10341 that is provided with a dormant function for cutting the circuit connection with the data-link initiation reception side device (the above-described RAS) when a suspension of operation (hereinbelow referred to as a "dormant state") occurs in the data-link initiation side device, i.e., the terminal device of an Internet user, and then reconnecting the circuit with the data-link initiation reception side device upon resumption of operation (active state) of the data-link initiation side device.

This dormant function is realized based on "MITF (Mobile Internet Access Forum) dial-up dormant protocol" (ARIB STD-T78 1.0, Jul. 27, 2001) which is the relevant standards of the PHS Internet Access Forum Standards (PIAFS) published by a corporate juridical person, the Association of Radio Industries and Businesses (ARIB) (HYPERLINK "http://www.arib.or.jp/").

On the first page of these standards, the communication environment for realizing the dormant function is shown in FIG. 1.1 "Communication environment applying MITF dial-up dormant protocol" in "Positioning of MITF dial-up dormant protocol."

In a communication system that employs this type of MITF dial-up dormant protocol, circuit resources that are provided in a RAS are distinguished between physical link resources, which are circuit resources for connecting to a terminal device by way of a circuit-switching network, and logical link resources, which are circuit resources for connecting to an ISP server by way of the Internet. When a particular call is set to the dormant state in an RAS, the physical link resource is released while the connection of the logical link resource of this call that is in the dormant state is maintained without change. Thus, even when the physical link resource is unexpectedly cut off due to such factors as the deterioration of the radio wave state in, for example, a portable telephone, the maintenance of the logical link resource allows the continuation of the original call by reconnecting only the physical link resource.

The above-described physical link resources are circuit resources such as a telephone lines, and there is consequently a limit to the number of physical link resources that can be provided in an RAS. As a result, the number of terminal devices that can connect to a circuit is limited by the number of physical link resources. With the rapid increase in Internet use in recent years, the connection capacity between an RAS and terminal devices has become inadequate, and there is the consequent problem that dial-up connection service cannot be provided for new calls from terminal devices and calls are lost.

SUMMARY OF THE INVENTION

It is an object of the present invention to provide a communication system and an RAS that are capable of reducing the loss probability without increasing the number of physical link resources of the RAS.

To achieve the above-described object, the remote access server of the present invention sets the logical link resource number, which is the number of logical link resources, to a greater number than the physical link resource number, which is the number of physical link resources; and upon receiving a new connection request from a terminal device, uses a logical link resource and a connection identifier that are not in current use to connect to an ISP server. Then, upon receiving a request from a terminal device indicating a transition to the dormant state, the remote access server of the present invention releases the physical link resource to the terminal device while maintaining the logical link resource to the ISP server unchanged in the connected state; and upon receiving a reconnection request from the terminal device that indicates a connection identifier, the remote access server uses the logical link resource that is set for that connection identifier to reconnect.

According to the present invention, the number of logical link resources, which are circuit resources to an ISP server, is set to a number that is greater than the number of physical link resources, which are the circuit resources to terminal devices; and when a particular circuit makes the transition to the dormant state, the logical link resource is kept unchanged in the connected state while the physical link resource alone is released to allow use by another terminal device, whereby the loss probability can be reduced without increasing the number of physical link resources.

The above and other objects, features, and advantages of the present invention will become apparent from the following description with reference to the accompanying drawings, which illustrate examples of the present invention.

DETAILED DESCRIPTION OF THE PREFERRED EMBODIMENTS

Figure 1:
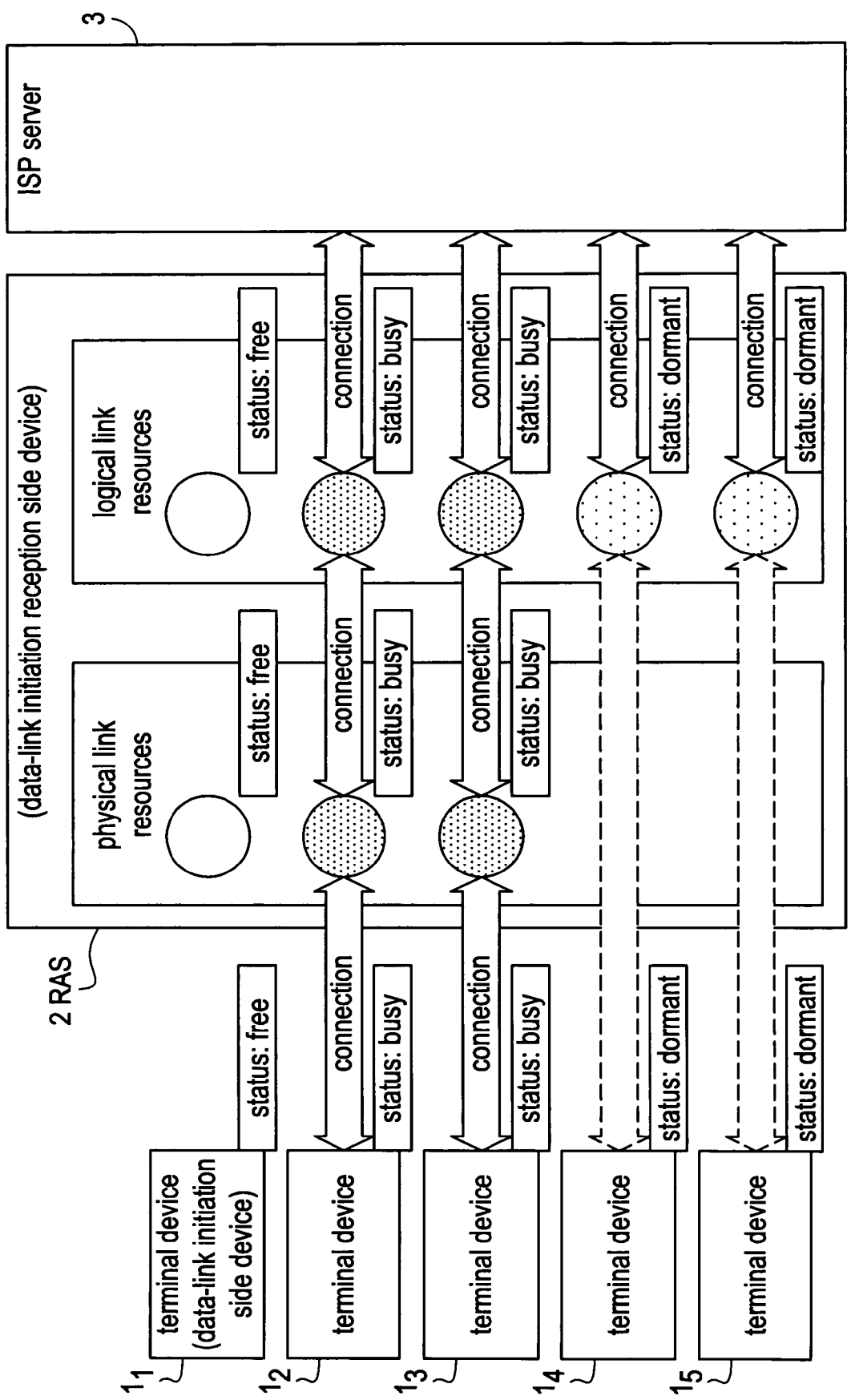
FIG. 1 is a block diagram showing the configuration of the communication system according to the first embodiment of the present invention.

Before describing each of the embodiments of the present invention, an outline of the present invention is presented with reference to FIG. 1. In the communication system that is shown in FIG. 1, five terminal devices $1_1$-$1_5$ and one RAS 2 are connected by means of a circuit-switching network, and RAS 2 and ISP server 3 are connected by the Internet.

Conventionally, when the circuit resources of an RAS are divided between physical link resources and logical link resources, no restrictions were placed on the relation between the number of physical link resources and the number of logical link resources. The present invention, however, divides the management of the circuit resources of RAS 2, which is the data-link initiation reception side device, between the physical link resources to terminal devices $1_1$-$1_5$, which are the data-link initiation side devices, and the logical link resources to ISP server 3. By thus installing a greater number of logical link resources, which are easy to expand, than the number of physical link resources, the number of simultaneous connections is increased and the loss probability is reduced.

The physical link resources that can be provided in RAS 2, which is the data-link initiation reception side device, are limited in number depending on the device. As a result, the number of terminal devices $1_1$-$1_5$, which each have similar functions and which are each independent, that can be simultaneously connected to ISP server 3 is dependent upon the number of physical link resources. In FIG. 1, a case is shown in which there are three physical link resources, and the number of simultaneous connections is therefore three.

In RAS 2, logical link resources are provided for connecting to ISP server 3. The number of logical link resources is made greater than the number of physical link resources in order to expand the number of simultaneous connections to ISP server 3. In FIG. 1, five logical link resources are present, and the number of simultaneous connections to ISP server 3 is therefore five.

When a connection request arrives from terminal device 1, a physical link resource and logical link resource are captured in that order, and connection is established from the logical link resource to ISP server 3, whereby the communication is first enabled between terminal device 1 and ISP server 3. When a non-communication state of a set time interval is detected in this communication-enabled state, the physical link resource is released in RAS 2, and terminal device 1 and logical link resource transit to a state referred to as the dormant state in which resources are captured but at rest. The physical link resource that is released enters a state that allows capture for a new connection request from terminal devices $1_1$-$1_5$.

When a terminal device that is in the dormant state among terminal devices $1_1$-$1_5$ wishes to communicate again, the terminal device submits a reconnection request. In RAS 2, a new physical link resource is captured, following which the previously captured logical link resource that is in the dormant state is searched and connected to continue the previous communication.

Thus, in the present invention, physical link resources that are in a non-communication state are released to other terminal devices that wish to communicate, whereby limited resources are effectively used, rejections of call connections due to a busy state are reduced, and the loss probability is decreased.

Details of the embodiments of the present invention are next described with reference to the accompanying figures.

First Embodiment

Figure 2:
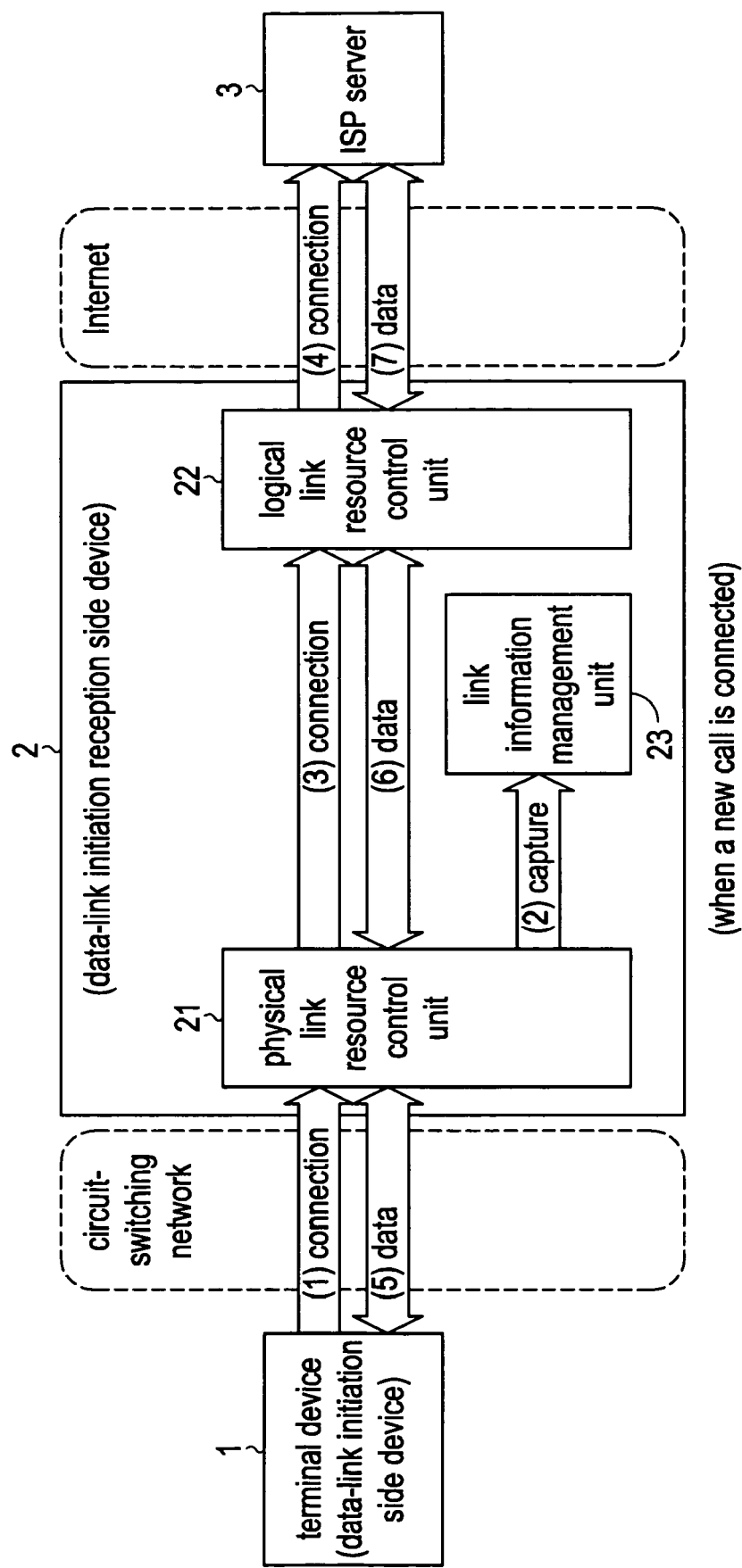
FIG. 2 shows the operations when a new call is connected in the communication system of the first embodiment of the present invention.

FIG. 2 is a block diagram showing the configuration of the communication system of the first embodiment of the present invention.

The communication system of the present embodiment shows operations when there is one RAS, and in the interest of simplifying the explanation, a case is shown having only one terminal device, terminal device 1.

The communication system of the present embodiment is made up by: terminal device 1, which is the data-link initiation side device; RAS 2, which is the data-link initiation reception side device that is activated by receiving a call from terminal device 1; and ISP server 3, which is the access destination when terminal device 1 refers to a Web page.

Terminal device 1 and RAS 2 are further connected by a circuit-switching network, and RAS 2 connects to ISP server 3 by way of the Internet.

Terminal device 1 is the data-link initiation side device that is manipulated by a user that uses the Internet, and terminal device 1 randomly connects to, communicates with, and is released by RAS 2.

ISP server 3 is a server such as a Web server or a mail server and operates passively in accordance with requests.

RAS 2 connects to terminal device 1 by way of a circuit-switching network, is provided with the function of repeating data that are transmitted and received between terminal device 1 and the Internet, and is made up by physical link resource control unit 21, logical link resource control unit 22, and link information management unit 23.

Physical link resource control unit 21 manages the physical link resources that are the circuits to terminal device 1, and upon receiving a connection request from terminal device 1, accesses link information management unit 23, captures a logical link resource and a connection identifier that are not in current use, issues a connection request that designates the captured logical link resource to logical link resource control unit 22, and transmits the captured connection identifier to terminal device 1 that sent the connection request. Upon receiving a request from terminal device 1 indicating a transition to the dormant state, physical link resource control unit 21 releases the physical link resource to terminal device 1. In addition, upon receiving from terminal device 1 a reconnection request that indicates the connection identifier, physical link resource control unit 21 further searches link information management unit 23 to specify the logical link resource that is set for that connection identifier, and carries out a connection request that designates the specified logical link resource to logical link resource control unit 22.

Logical link resource control unit 22 manages logical link resources, which are circuits to ISP server 3 by way of the Internet, and upon receiving a connection request that designates a logical link resource that is to be used from physical link resource control unit 21, uses the logical link resource that is designated to connect to ISP server 3.

Physical link resource control unit 21 and logical link resource control unit 22 each store their partner's resources such that resources can be placed in a one-to-one correspondence during communication, and transfer data in accordance with requests.

Link information management unit 23 manages the vacancy (the current state of use) of the connection identifiers (CID) and the logical link resources, and stores information on logical link resources that are currently in use in correspondence with the connection identifiers that are set to these logical link resources. Link information management unit 23 then captures, searches, and releases logical link resources and connection identifiers in accordance with requests from physical link resource control unit 21 and logical link resource control unit 22.

Details regarding the operations of the communication system of the present embodiment are next described with reference to the figures.

First, referring to FIG. 2, the operations when connecting a new call in the communication system of the present embodiment are described.

When a link is established from terminal device 1 to RAS 2 (step 1), physical link resource control unit 21 in RAS 2 accesses link information management unit 23 and captures a free logical link resource and connection identifier (step 2). Physical link resource control unit 21 then uses inter-process communication to logical link resource control unit 22 to request connection (step 3). When logical link resource makes the transition to a state that allows communication, RAS 2 reports a connection identifier to terminal device 1. Data communication is enabled when a connection is completed from terminal device 1 to ISP server 3, and all resource states enter the in-use state (steps 5-7).

Figure 3:
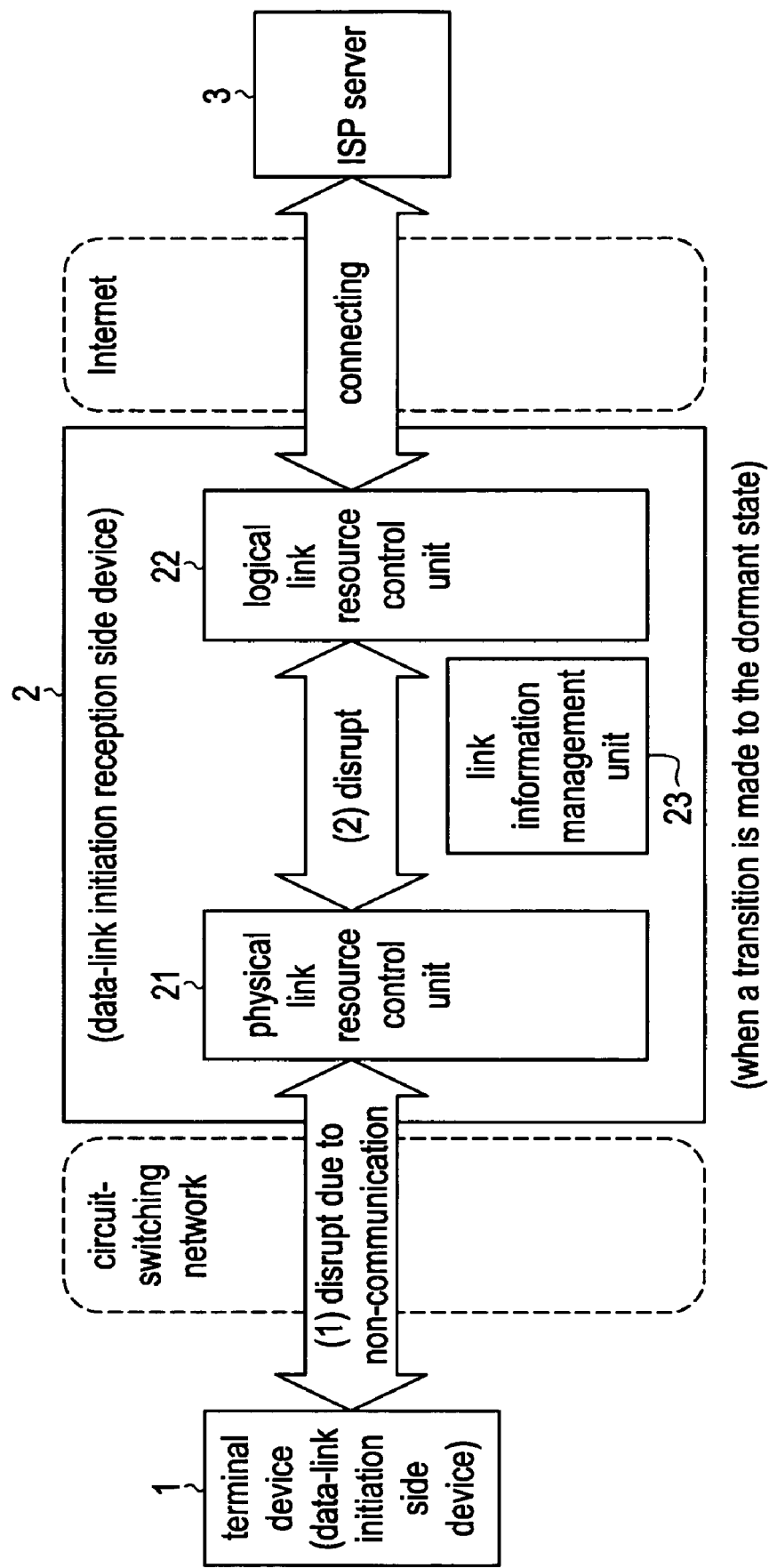
FIG. 3 shows the operations when a transition is made to the dormant state in the communication system of the first embodiment of the present invention.

Next, referring to FIG. 3, the operations when a transition is made to the dormant state in the communication system of the present embodiment are described.

The transition to the dormant state occurs when terminal device 1 detects non-communication for a fixed time interval, and the release is therefore carried out by terminal device 1 (step 1). At this time, the connection between physical link resource control unit 21 and logical link resource control unit 22 is cut, the physical link resource between terminal device 1 and RAS 2 is released, the link information of RAS 2 is held, the logical link resource with terminal device 1 enters the dormant state, and a reconnection standby state begins (step 2).

Figure 4:
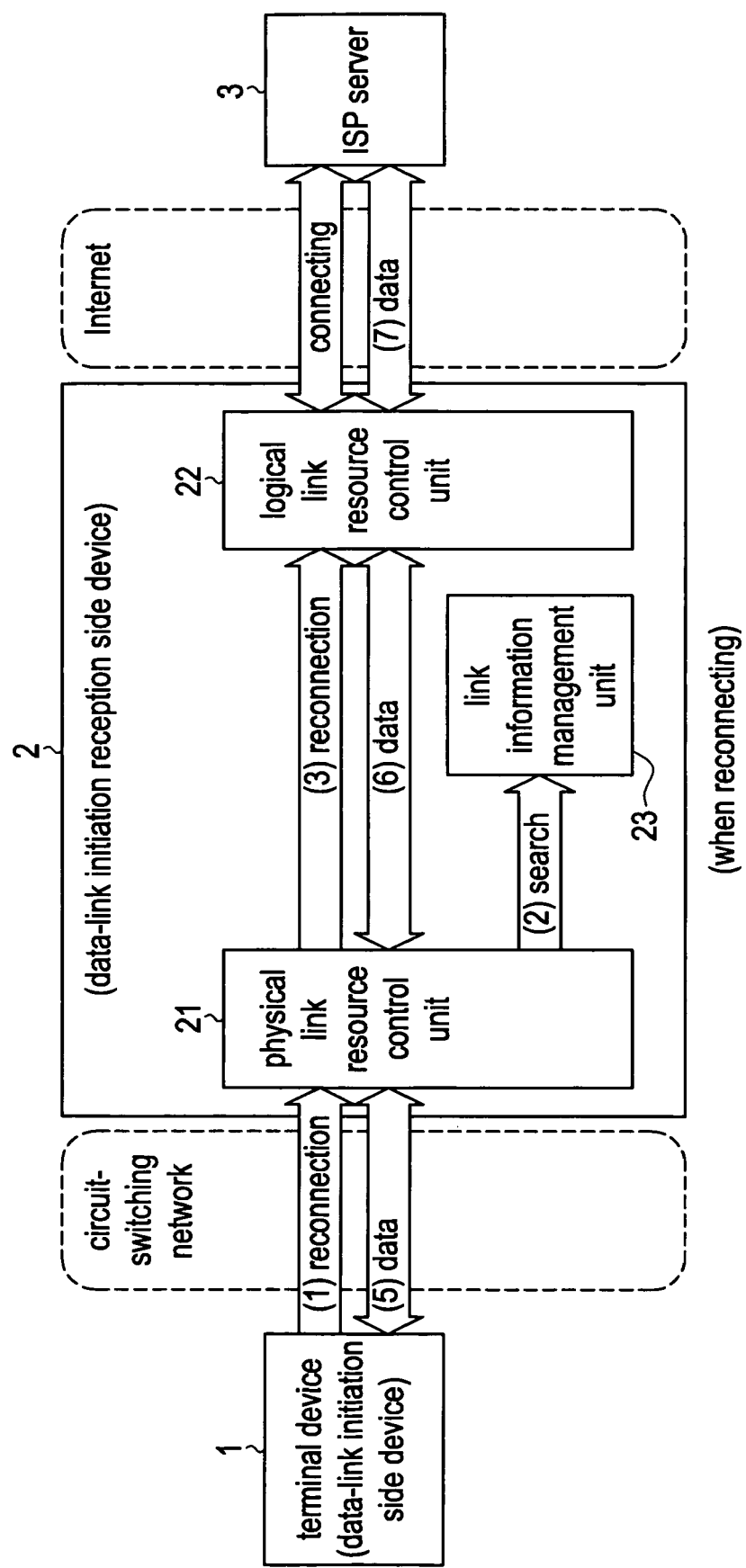
FIG. 4 shows the operations when reconnecting in the communication system of the first embodiment of the present invention.

Next, referring to FIG. 4, the operations when reconnecting in the communication system of the present embodiment are described. Terminal device 1 designates the connection identifier that was issued in the initial connection and issues a reconnection request (step 1). Physical link resource control unit 21 in RAS 2 that received the call accesses link information management unit 23, searches the logical link resource that has already been captured based on the connection identifier (step 2), and reconstructs the link for this logical link resource (step 3). The call preceding cut off is thus reconnected without alteration of the logical link resource (steps 5-7).

Figure 5:
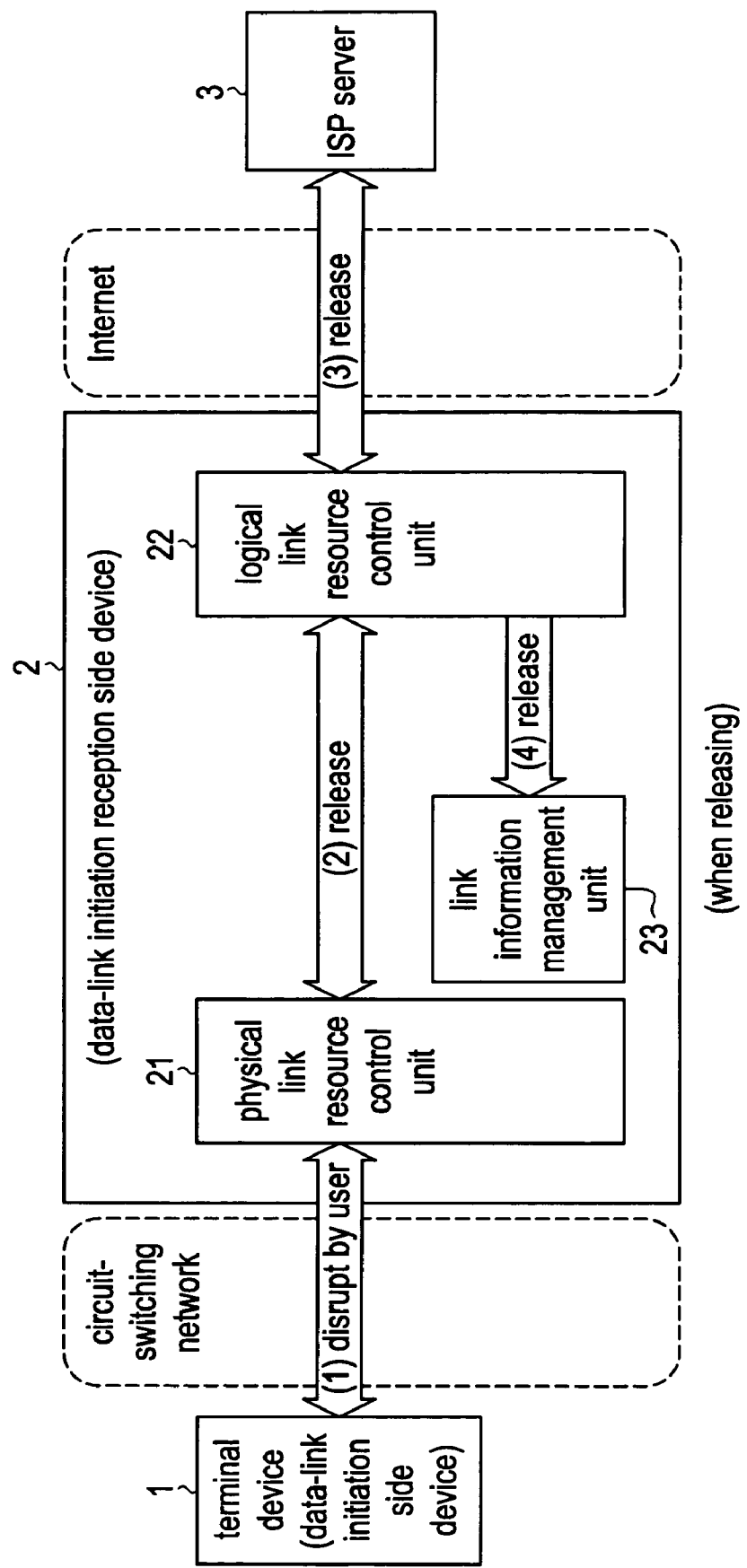
FIG. 5 shows the operations when releasing in the communication system of the first embodiment of the present invention.

Referring to FIG. 5, the operations during release in the communication system of the present embodiment are next described.

First, when disconnection occurs according to a user's intentions in terminal device 1, terminal device 1 transmits a request for intentional release to distinguish from a transition to the dormant state (step 1). This release request is transferred by way of physical link resource control unit 21 as far as logical link resource control unit 22 (step 2). Logical link resource control unit 22, after releasing all connections (step 3), both requests link information management unit 23 to release the captured resource and releases its own resource (step 4).

Figure 6:
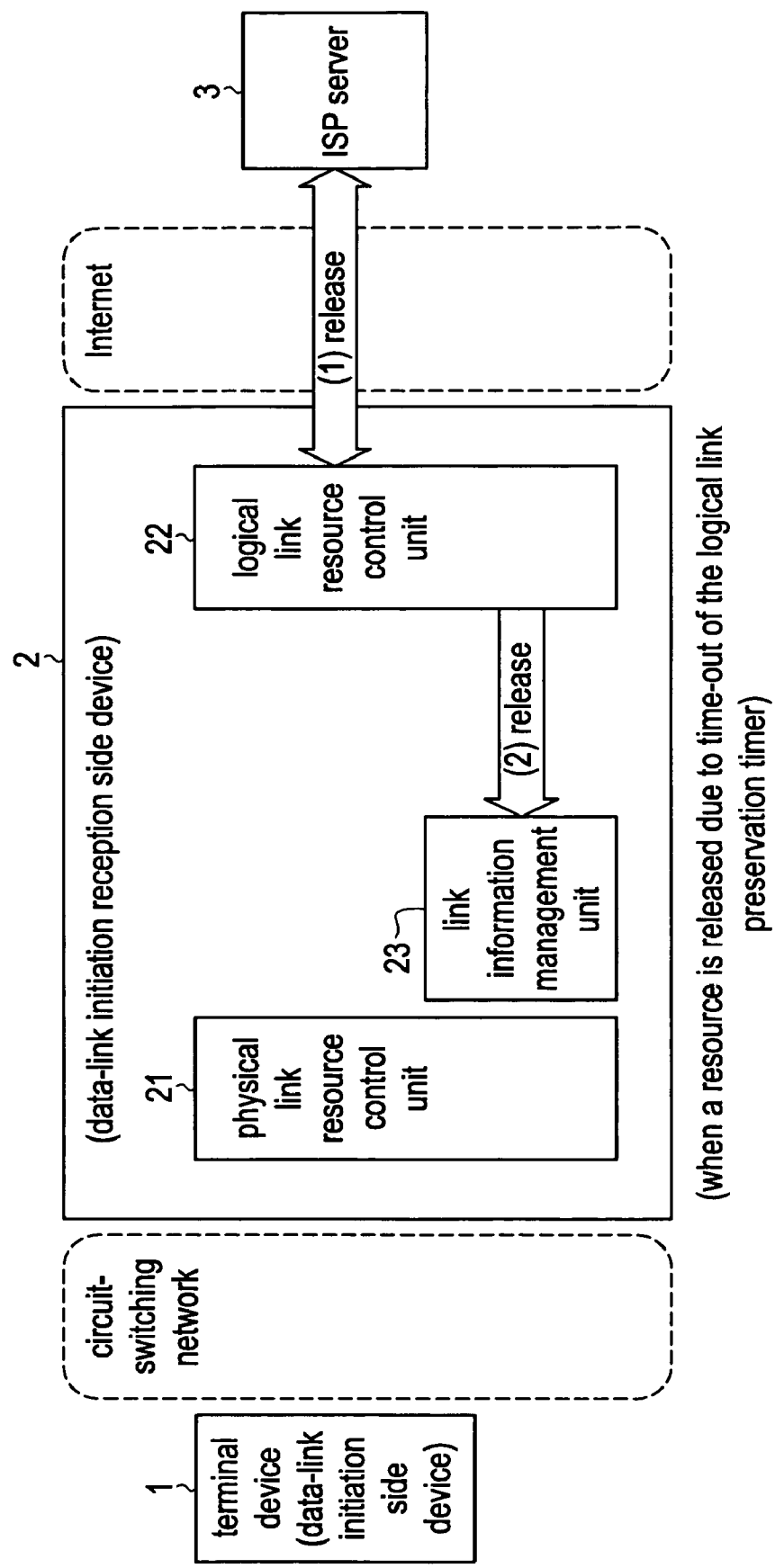
FIG. 6 shows the operations when a resource is released due to time-out of the logical link preservation timer in the communication system of the first embodiment of the present invention.

Finally, referring to FIG. 6, explanation is presented regarding the operations when releasing resources due to time-out of the logical link preservation timer in the communication system of the present embodiment.

The logical link preservation timer is a timer for forcibly releasing a resource when reserving has continued for a fixed time period. When a long time interval has elapsed after the transition of a logical link resource to the dormant state, logical link resource control unit 22 both releases the link information and releases the connection of the logical link resource to ISP server 3 to cause the transition to the free state (step 1). Logical link resource control unit 22 then issues a request to link information management unit 23 to release the captured resource (step 2).

Figure 7:
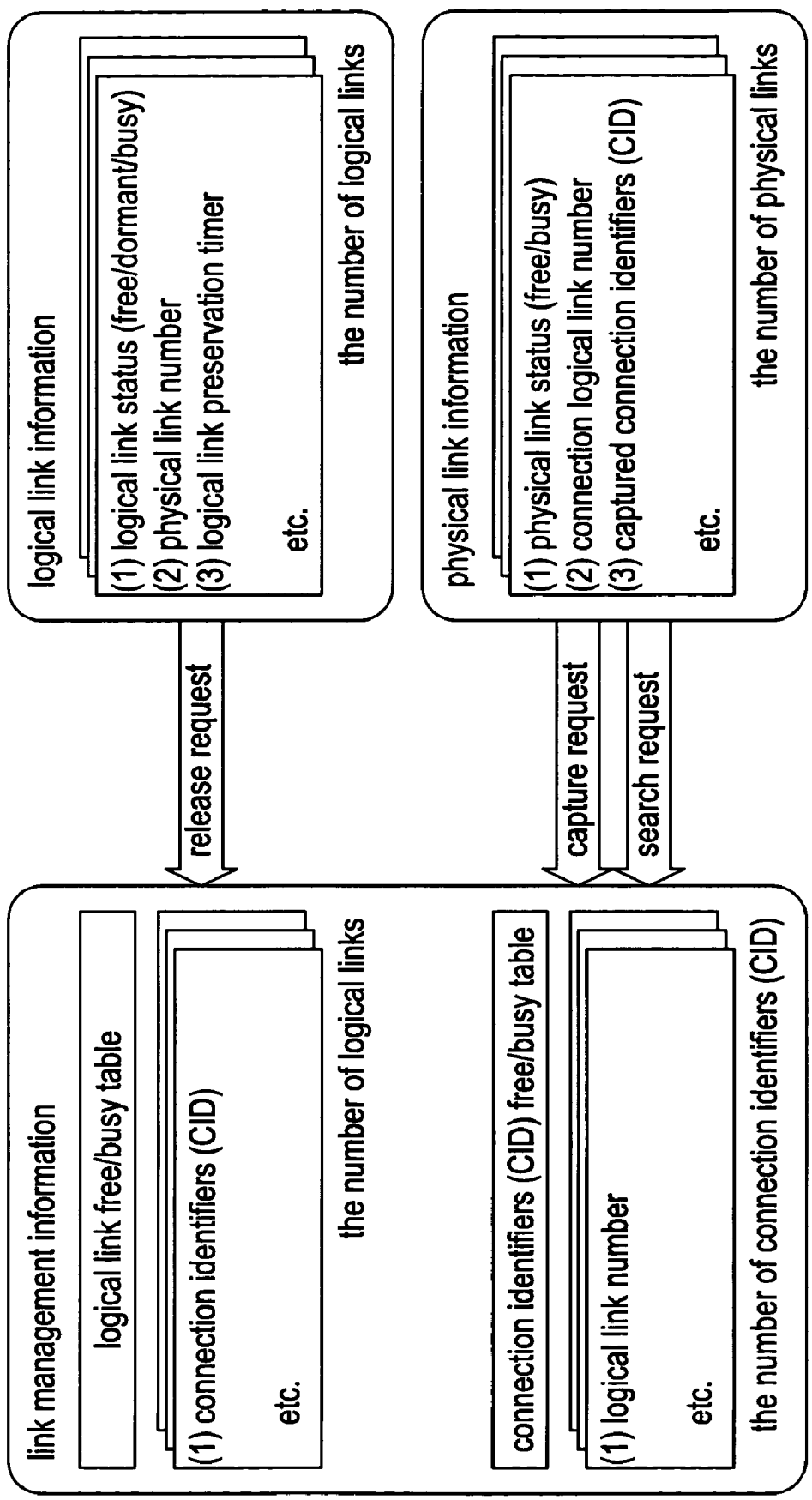
FIG. 7 shows each of the types of information that are used in the communication system of the first embodiment of the present invention.

Next, referring to FIG. 7, explanation is presented regarding the various types of information used in the communication system of the present embodiment.

A link capture request is issued from physical link resource control unit 21 to link information management unit 23 after the capture of a physical link resource at the time of initial connection. Link information management unit 23, after having received this link capture request, captures a connection identifier and a logical link number without conditions, and notifies the result to physical link resource control unit 21. Physical link resource control unit 21 and logical link resource control unit 22 each then save the captured connection identifier and logical link number.

A link search request is issued from physical link resource control unit 21 to link information management unit 23 after a physical link resource is captured at the time of reconnection. Link information management unit 23, having received this link search request, searches for the logical link number based on the connection identifier. If the connection identifier is free, link information management unit 23 switches to the link capture process to newly capture a logical link number.

The information that is found as a result of these requests is reflected in the physical link information and logical link information and communication is carried out between physical link resource control unit 21 and logical link resource control unit 22.

A link release request is issued from logical link resource control unit 22 to link information management unit 23 at the time of releasing a logical link resource. Link information management unit 23, having received this link release request, releases both the connection identifier and logical link number that were being used as well as the corresponding information.

According to the communication system of the present embodiment, RAS 2, by causing terminal device 1 that is not communicating data to make the transition to the dormant state, returns physical link resources that are limited in number to a state that allows use by other terminals, whereby call connection failures caused by inadequate physical link resources can be avoided and the loss probability can be reduced.

In the present embodiment, explanation regarded a case in which the number of physical link resources was three and the number of logical link resources was five, but the present invention is not limited to this form, and the present invention can be similarly applied regardless of the setting of the numbers of link resources as long as the number of logical link resources is set to be greater than the number of physical link resources.

Second Embodiment

Explanation next regards the communication system of the second embodiment of the present invention. The communication system of this embodiment is a case in which the present invention is applied to a system that is provided with a plurality of RAS. In the present embodiment, a system that can be matched to a large-capacity RAS can be constructed by providing a plurality of RAS and by providing, as a separate device that is shared in the system, one link information management unit 23 of the first embodiment that was shown in FIG. 2.

The communication system of the present embodiment is made up by terminal device 1, a plurality of RAS 12, ISP server 3, and connection management server 4. However, in the interest of simplifying the explanation, only one RAS 12 is shown in FIG. 8.

In addition, RAS 12 is provided with: physical link resource control unit 21, logical link resource control unit 22, and an inter-RAS communication control unit (not shown in the figure). The inter-RAS communication control unit controls communication between RAS for communicating data with other RAS.

Connection management server 4 is provided with functions that are equivalent to those of link information management unit 23 in the first embodiment that was shown in FIG. 2 and implements overall control of the information relating to the state of use of the logical link resources of the plurality of RAS 12. In connection management server 4, an RAS number, which is information for specifying the RAS in which logical link resources are provided, must be held in addition to the information that was shown in FIG. 7. In addition, the RAS numbers of RAS that are connected together are held in the physical/logical link information, and the RAS must designate each other to realize inter-RAS communication.

Figure 8:
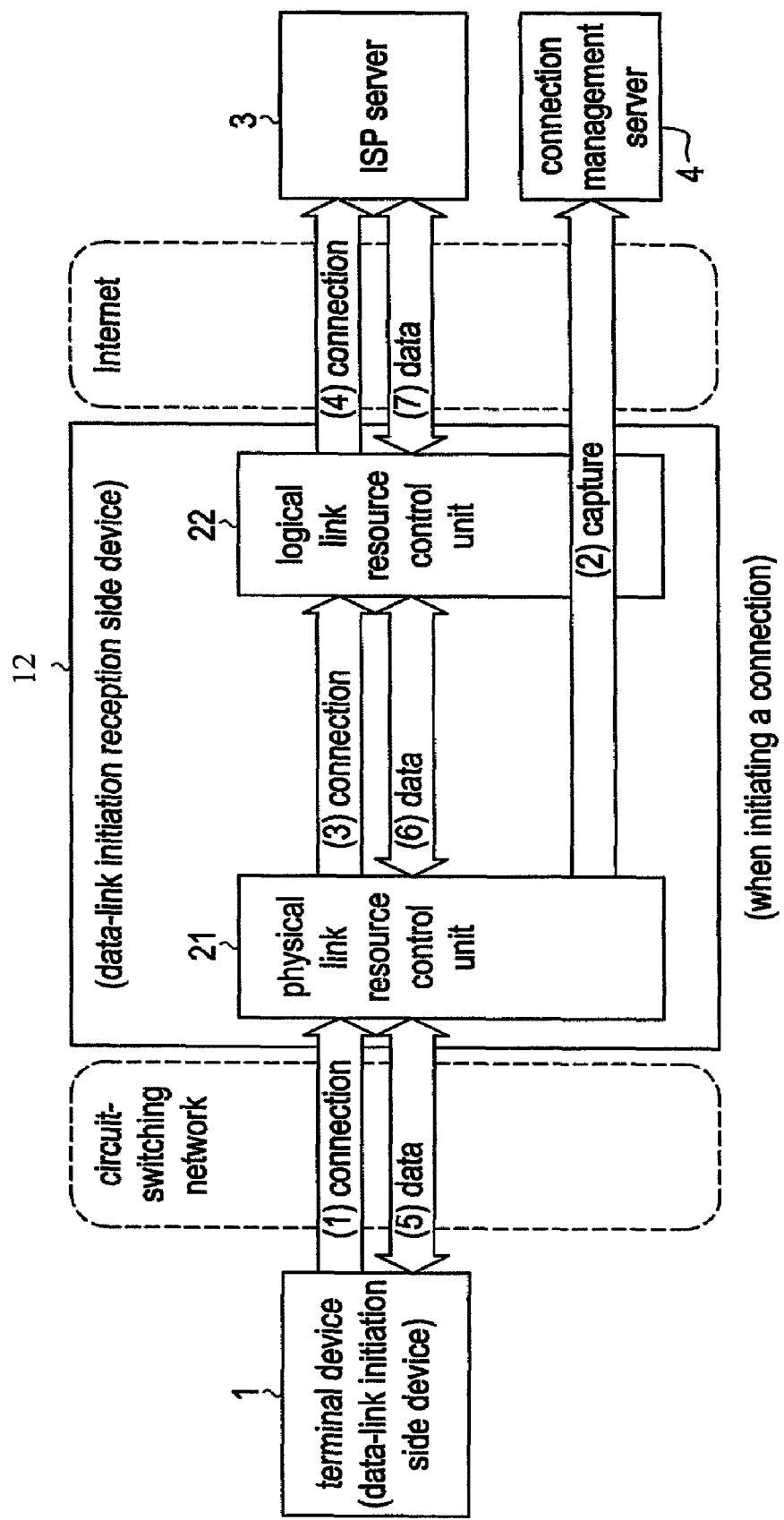
FIG. 8 shows a summary of the functions when initiating a connection in the communication system of the second embodiment of the present invention.
Figure 9:
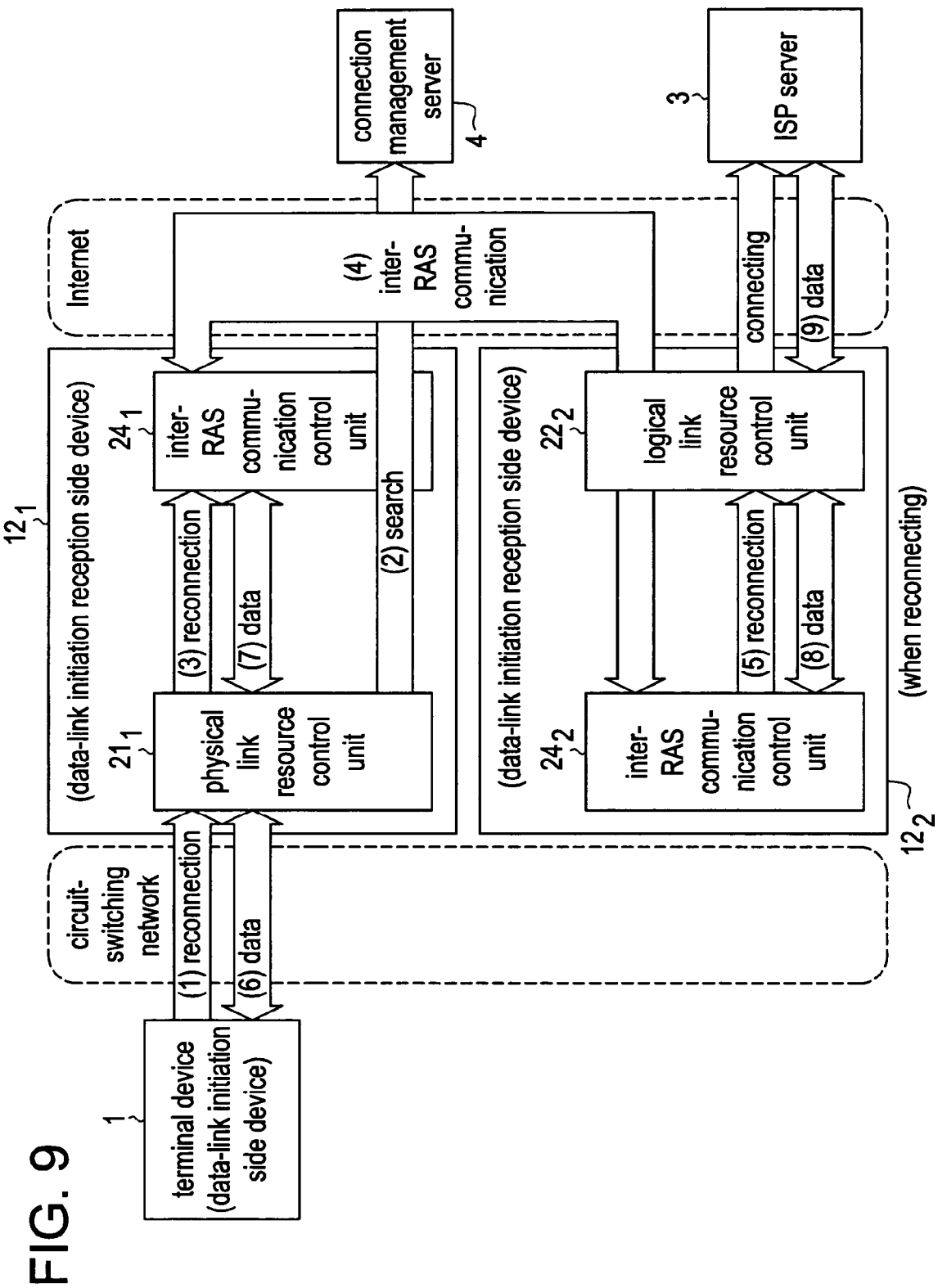
FIG. 9 shows a summary of the functions when reconnecting in the communication system of the second embodiment of the present invention.
Figure 10:
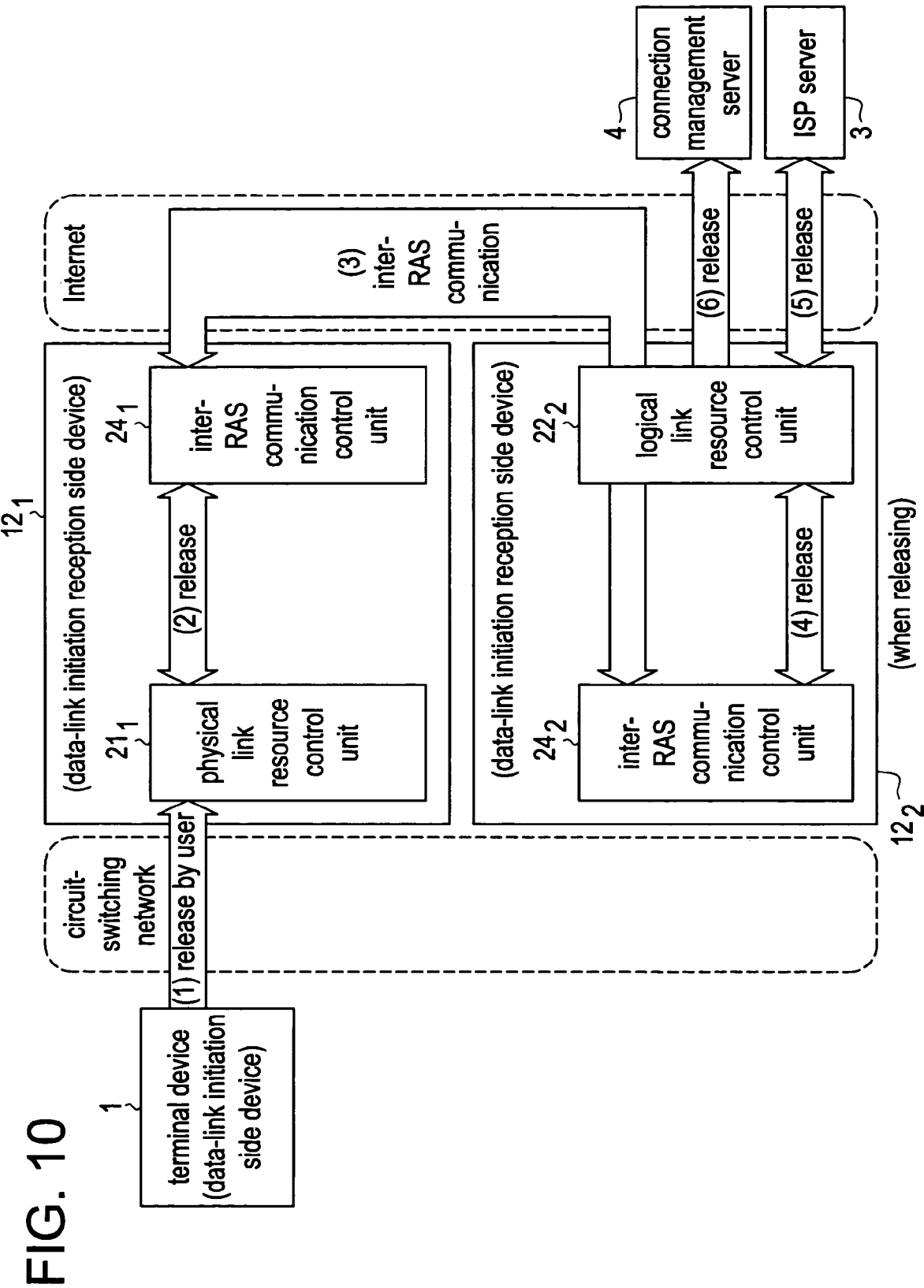
FIG. 10 shows a summary of the functions when releasing in the communication system of the second embodiment of the present invention.

Explanation next regards the operations of the communication system of the present embodiment with reference to FIGS. 8-10.

Referring first to FIG. 8, an outline is presented regarding the functions at the time of initial connection in the communication system of the present embodiment.

First, a connection request is issued from terminal device 1 to RAS 12 by way of a circuit-switching network (step 1). Physical link resource control unit 21, having received the initial connection request from terminal device 1, communicates with connection management server 4, which is an external device, makes a resource capture request (step 2), and captures a connection identifier and a logical link resource. At this time, the RAS that is the connection destination is determined by taking free resources into consideration, and the logical link resource that is captured is determined from within the same RAS as the physical link resource. The procedures of the subsequent steps 3 to 7 are identical to the procedures described with reference to FIG. 2, and redundant explanation is therefore here omitted. In addition, the procedures at the time of transition to the dormant state are identical to the procedures shown in FIG. 3.

Next, referring to FIG. 9, a summary is presented of the functions at the time of reconnection in the communication system of the present embodiment. In FIG. 9, a construction is shown in which two RAS, $12_1$ and $12_2$, are provided.

Physical link resource control unit $21_1$ and inter-RAS communication control unit $24_1$ are provided in RAS $12_1$. Although RAS $12_1$ is also provided with logical link resource control unit $22_1$, this component is not required in the operations here described and is therefore omitted in FIG. 9. RAS $12_2$ is provided with logical link resource control unit $22_2$ and inter-RAS communication control unit $24_2$. RAS $12_2$ is also provided with physical link resource control unit $21_2$, but this component is not required in the operations described here and is therefore omitted from FIG. 9.

Explanation is given for a case in which the initial connection request from terminal device 1 is received in RAS $12_2$, but when terminal device 1 issues a reconnection request after passing through a dormant state, all of the physical link resources of RAS $12_2$ are in use and the reconnection request from terminal device 1 is therefore received in RAS $12_1$.

The reconnection request is first issued from terminal device 1 to RAS $12_1$ by way of the circuit-switching network (step 1). Physical link resource control unit $21_1$ of RAS $12_1$, having received the reconnection request, issues a search request by means of the connection identifier to connection management server 4 (step 2), and the RAS number and logical link resource of the initial connection are acquired. If the search results indicate that the initial RAS number and logical link resource are not available, a capture process similar to that of the initial connection is carried out.

When the search results show that the physical link resource and logical link resource belong to the same RAS, communication is carried out that is the same as the communication at the time of the initial connection shown in FIG. 8. In other words, physical link resource control unit $21_1$, by searching connection management server 4, specifies the logical link resource that is set for that connection identifier and the RAS in which that logical link resource is provided, and when the specified RAS is the RAS of physical link resource control unit $21_1$, physical link resource control unit $21_1$ issues a connection request that designates the specified logical link resource.

When the search results show that the physical link resource that received the reconnection request from terminal device 1 and the logical link resource at the time of the initial connection belong to different RAS, physical link resource control unit $21_1$ issues a reconnection request to inter-RAS communication control unit $24_1$ (step 3). Inter-RAS communication control unit $24_1$ performs inter-RAS communication with inter-RAS communication control unit $24_2$ of RAS $12_2$, whereby physical link resources and logical link resources are connected between the RAS and a link is reconstructed (step 4). Inter-RAS communication control unit $24_2$ that has received the reconnection request by means of data communication with inter-RAS communication control unit $24_1$ issues a reconnection request to logical link resource control unit $22_2$ (step 5). By carrying out these procedures, a link is constructed between terminal device 1 and ISP server 3 by way of physical link resource control unit $21_1$, inter-RAS communication control units $24_1$ and $24_2$, and logical link resource control unit $22_2$ (steps 6-9).

Next, referring to FIG. 10, a summary is presented regarding the functions when releasing in the communication system of the present embodiment. When a release request by the user reaches physical link resource control unit $21_1$ of RAS $12_1$ from terminal device 1 (step 1), the release request is transferred by way of inter-RAS communication control unit $24_1$, inter-RAS communication control unit $24_2$, and physical link resource control unit $22_2$, and all of the connections are cut (steps 2-5). After all connections have been cut, logical link resource control unit $22_2$ issues a request for the release of the connection identifier and logical link resource to connection management server 4 and releases its own resource (step 6).

In the present embodiment, connection management server 4, which comprehensively manages both information relating to the state of use of the logical link resources between the plurality of RAS and connection identifiers, is provided in common even when the communication system is made up by a plurality of RAS in which the number of logical link resources is set to a greater number than the number of physical link resources, and a system can therefore be constructed that can be matched to large-capacity RAS.

In addition, although not shown in the figures, RAS 2 and 12 in the above-described first and second embodiment are provided with recording mediums in which programs are recorded for executing the resource management method explained hereinabove. These recording mediums may be a magnetic disk, a semiconductor memory or other recording medium. The programs are read from the recording mediums to RAS 2 and 12 and control the operations of RAS 2 and 12. More specifically, CPUs in RAS 2 and 12, under the control of these programs, instruct the hardware resources of RAS 2 and 12 to carry out specific processing, whereby the above-described procedures are realized.

While preferred embodiments of the present invention have been described using specific terms, such description is for illustrative purposes only, and it is to be understood that changes and variations may be made without departing from the spirit or scope of the following claims.

What is claimed is:

1. A remote access server that is a data-link initiation reception side device that, in accordance with a connection request that is received by way of a circuit-switching network from a terminal device, which is the data-link initiation side device, initiates a link and connects to an Internet Service Provider (ISP) server by way of the Internet; and controls connections, said remote access server comprising:
    divided circuit resources that are provided between physical link resources to each of said terminal devices and logical link resources to said ISP server, and
    means for, upon receiving new connection requests from terminal devices, using a logical link resource and a connection identifier that are not in current use to connect to said ISP server; and
    means for, upon receiving a request from a terminal device indicating a transition to a dormant state, releasing the physical link resource to said terminal device while maintaining the connection of the logical link resource to said ISP server without change, and upon receiving a reconnection request that indicates a connection identifier from a terminal device, using the logical link resource that is set to that connection identifier to implement reconnection,
    wherein a logical link resource number, which is the number of said logical link resources, is set greater than a physical link resource number, which is the number of said physical link resources.

2. A remote access server that is a data-link initiation reception side device that, in accordance with a connection request that is received by way of a circuit-switching network from a terminal device, which is a data-link initiation side device, initiates a link and connects to an Internet Service Provider (ISP) server by way of the Internet; said remote access server comprising:
    a link information management unit that:
        manages connection identifiers and information that relates to the state of use of logical link resources, which are circuit resources to said ISP server, and
        links and stores information of logical link resources that are currently being used and connection identifiers that are set to said logical link resources;
    a physical link resource control unit that:
        manages physical link resources, which are circuit resources to each said terminal device;
        upon receiving a connection request from a terminal device, accesses said link information management unit and captures a logical link resource and a connection identifier that are not in current use, issues a connection request that designates the captured logical link resource, and transmits the captured connection identifier to the terminal device that sent the connection request;
        upon receiving a request indicating a transition to a dormant state from a terminal device, releases the physical link resource to that terminal device; and
        upon receiving a reconnection request that indicates a connection identifier from a terminal device, searches said link information management unit and thus specifies the logical link resource that is set to that connection identifier, and issues a connection request that designates the logical link resource that was specified; and
    a logical link resource control unit that:
        manages logical link resources that are greater in number than a physical link resource number, which is the number of said physical link resources; and
        upon receiving a connection request from said physical link resource control unit that designates a logical link resource that is to be used, uses the logical link resource that was designated to connect to said ISP server.

3. A resource management method, which is a method of managing circuit resources that are provided in a remote access server, which is the data-link initiation reception side device, that, in accordance with a connection request that is received by way of a circuit-switching network from a terminal device, which is the data-link initiation side device, initiates a link and connects to an Internet Service Provider (ISP) server by way of the Internet; said resource management method comprising:
    dividing circuit resources that are provided in a remote access server between physical link resources to each said terminal device and logical link resources to said ISP server, and setting such that a logical link resource number, which is the number of said logical link resources, is greater than a physical link resource number, which is the number of said physical link resources;
    upon receiving a new connection request from a terminal device, using a logical link resource and connection identifier that are not currently being used to connect to said ISP server;
    upon receiving a request from a terminal device indicating a transition to a dormant state, releasing the physical link resource to the terminal device while maintaining the connection of the logical link resource to said ISP server without change; and upon receiving a reconnection request from a terminal device indicating a connection identifier, using the logical link resource that is set to the connection identifier to reconnect.

4. A communication system, comprising:
a plurality of data-link initiation side devices, which are terminal devices of users that use the Internet;
a connection management server that:
- manages information relating to connection identifiers and the state of use of logical link resources of a plurality of remote access servers and information for specifying the remote access servers that are provided with logical link resources that are used, and
- links and stores information on logical link resources that are currently in use with connection identifiers that are set to these logical link resources and information for specifying remote access servers in which these logical link resources are provided; and a plurality of remote access servers (RAS) that are each provided with:
- a physical link resource control unit that:
  - manages physical link resources, which are circuit resources to each said terminal device;
  - upon receiving a connection request from a terminal device, accesses a link information management unit and captures a logical link resource and a connection identifier that are not in current use, issues a connection request that designates the logical link resource that was captured, and transmits the captured connection identifier to the terminal device that sent the connection request;
  - upon receiving a request indicating transition to a dormant state from a terminal device, releases the physical link resource to that terminal device; and
  - upon receiving a reconnection request indicating a connection identifier from a terminal device, searches said connection management server to specify the logical link resource that is set to that connection identifier and the remote access server in which that logical link resource is provided, issues a connection request that designates the logical link resource that was specified when the remote access server that was specified is its own device, and issues a connection request to an inter-RAS communication control unit when the remote access server that was specified is another remote access server;
- a logical link resource control unit that:
  - manages logical link resources that are greater in number than a physical link resource number, which is the number of said physical link resources; and
  - upon receiving a connection request that designates a logical link resource that is to be used from said physical link resource control unit or said inter-RAS communication control unit, uses the designated logical link resource to connect to an Internet Service Provider (ISP) server; and
- an inter-RAS communication control unit that communicates data with other remote access servers.

* * * * *